US012138951B1

(12) United States Patent
Park et al.

(10) Patent No.: US 12,138,951 B1
(45) Date of Patent: Nov. 12, 2024

(54) WRITING INSTRUMENT FOR ERASING HANDWRITTEN CONTENT

(71) Applicant: CROWN BALLPEN CO., LTD., Gyeongsangnam-do (KR)

(72) Inventors: Young Saeng Park, Busan (KR); Bae Jo Park, Busan (KR)

(73) Assignee: CROWN BALLPEN CO., LTD., Gyeongsangnam-do (KR)

( * ) Notice: Subject to any disclaimer, the term of this patent is extended or adjusted under 35 U.S.C. 154(b) by 0 days.

(21) Appl. No.: 18/376,868

(22) Filed: Oct. 5, 2023

(30) Foreign Application Priority Data

Jun. 19, 2023 (KR) ........................ 10-2023-0077904

(51) Int. Cl.

*B43K 7/00* (2006.01)
*B43K 7/12* (2006.01)
*B43K 29/02* (2006.01)
*B43L 19/00* (2006.01)

(52) U.S. Cl.

CPC ................ *B43K 7/005* (2013.01); *B43K 7/12* (2013.01); *B43K 29/02* (2013.01); *B43L 19/0025* (2013.01); *B43L 19/0056* (2013.01)

(58) Field of Classification Search

CPC .......... B43K 29/02; B43K 7/005; B43K 7/12; B43K 29/00; B43K 29/007; B43K 5/005; B43K 8/003; B43L 19/0025; B43L 19/00; B43L 19/0056; B43L 19/0068; B43L 19/0075; B43L 19/0081

USPC .............. 401/52, 195; 15/424–428, 431, 432

See application file for complete search history.

(56) References Cited

U.S. PATENT DOCUMENTS

| | | | | |
|---|---|---|---|---|
| 6,505,984 B2 * | 1/2003 | Smith | B43K 29/02 | 401/52 |
| 2002/0159817 A1 * | 10/2002 | Brand | B43K 19/00 | 401/52 |
| 2010/0098476 A1 * | 4/2010 | Imamura | B43K 5/16 | 401/1 |

FOREIGN PATENT DOCUMENTS

| | | |
|---|---|---|
| KR | 102179179 | 11/2020 |
| KR | 102400821 | 5/2022 |
| KR | 102400822 | 5/2022 |

* cited by examiner

*Primary Examiner* — David J Walczak
(74) *Attorney, Agent, or Firm* — IPLA P.A.

(57) ABSTRACT

A writing instrument having a removal function of a handwritten content is provided where a tip erasing body that erases incorrectly written words or pictures is formed on the outer peripheral surface of a lower body, and the tip erasing body and the lower body are formed by a double injection molding method. An integrated one body prevents any form of gap between the tip erasing body and the lower body. Since the tip erasing body is integrally made with the lower body, when a user wants to erase incorrect contents, an unstable state like a conventional product can be overcome.

6 Claims, 7 Drawing Sheets

100

WRITING INSTRUMENT FOR ERASING HANDWRITTEN CONTENT

BACKGROUND

The present invention relates to a writing instrument for erasing a handwritten content, and more particularly, to a writing instrument capable of easily removing the content while a user of the writing instrument writes or draws a word, a symbol, or a shape by using the writing instrument without changing of holding the writing instrument.

People are using writing instruments to express their thoughts and/or feelings. The most representative writing instrument may be a ballpoint pen. A ballpoint pen can be abbreviated as a ball pen. The ballpoint pen has an ink filling tube filled with viscous ink therein, and allows a predetermined word or character to be written or a predetermined figure to be drawn on the paper.

The ballpoint pen has been used as a daily writing instrument that is very cheap, reliable, and does not spend much money in purchasing and use, and it is almost replaced by today's fountain pen. Unlike the fountain pen, the user does not need to charge the ink separately, and it is not only possible to select and use ink of various colors, but also is widely distributed due to its economy and convenience, such as very inexpensive and easy to use.

However, the ballpoint pen has a disadvantage that it was difficult to erase the words such as a pencil after writing predetermined words, numbers, or shapes on the surface of a handwriting object, such as paper.

To overcome these shortcomings of ballpoint pens, an erasing ballpoint pen was developed. The operating principle of today's erased ballpoint pen can be explained by the friction heat use method and the friction force use method.

The above friction heat use method is to write words or shapes on paper using thermal ink and discolor the color of the thermal ink by friction heat so that the above words or shapes disappear from view.

This conventional method of using frictional heat is to attach a plastic eraser to the opposite end of ballpoint pens, rub the above plastic eraser on top of the above text or figure to cause friction between them, and use the generated frictional heat to change the color of the above thermal ink.

However, in the case of the conventional friction heat use method, a separate elastomer eraser had to be attached or combined to the opposite end of the pen tip of the ballpoint pens as a tool for generating friction heat. In addition, in the case of the conventional friction heat use method, the main body of the writing instrument had to be reversed to erase incorrect expressions, so the correction work had a cumbersome disadvantage, and it also had a decisive disadvantage of missing an instantaneous idea, feeling, or plot. In addition, when using the above elastomer eraser, eraser residue is generated and contaminated the surroundings, its volume is reduced due to wear, and the above elastomer eraser cannot be used later, so there was a disadvantage that it could not be used permanently.

On the other hand, the above friction force use method does not use the above thermal discoloration ink, but instead uses an adhesive ink with a certain adhesive force on the ground subject to writing work. If a user wants to erase words or shapes already written, the user contacts an eraser on the written words or shapes, rubs the words or shapes with the eraser, pushes the words or shapes written in adhesive ink on the paper by friction between them, and removes them from the paper.

The friction force method was recently developed by these inventors, and a front end erasing body mainly composed of polypropylene resin is formed in front of the front end of the ballpoint pens, and the adhesive ink is pushed off the ground paper using the front end erasing body.

However, the method of using friction force by the prior art was considered to have at least three technical problems.

First, the need to improve the mechanical coupling method has been raised. As clearly shown in FIGS. 2*a* to 2*c*, the prior art by these inventors manufactured the lower body 112 and the tip erasing body 120' separately, and then inserted the tip erasing body 120' into the lower body 112, and assembled the tip erasing body 120' to the front end of the lower body 112. Therefore, the prior art had to manually assemble or mechanically combine the tip erasing body 120' and the lower body 112, so the work process was difficult and cumbersome during the manufacturing process, and there was a disadvantage of very low productivity.

Second, a phenomenon in which the support of the overall body of the ballpoint pens is weakened was derived. As clearly shown in FIGS. 2*a* to 2*c*, the prior art by these inventors had to insert and fix the cylindrical tube of the tip erasing body 120' inside the cylindrical tube of the lower body 112, so the thickness of the lower body 112 had to be relatively thinner than before. As a result, the prior art has weakened the external shape support of the lower body 112, and has a drawback that the users cannot avoid feeling unstable compared to the prior art when grasping the ballpoint pens.

Third, the need to solve the unstable coupling relationship of the tip erasing body 120' attached to the lower body 112 has been derived. The prior art developed by these inventors is to contact the tip erasing body 120' on the incorrect word W, etc., and move the tip erasing body 120' to the wrong content several times in the left and right direction, so that the wrong content falls off the paper P. However, when the user applies a force to the tip eraser 120' and moves it in the left and right directions, the resistance acts in the opposite direction of the friction force, which further widens the assembled gap G between the tip eraser 120' and the lower body 112, and interferes with the operation. Therefore, as the user used the writing instrument according to the prior art, a gap G between the front tip erasing body 120' and the lower body 112 was generated, and due to this gap G, the erasing work by the writing instrument became rather difficult.

SUMMARY OF THE INVENTION

An object of the present invention is to provide a writing instrument having a removal function of a handwritten content, which can directly erase the content written on a writing object in a writing direction without modifying the direction of the writing instrument when a user of the writing instrument intends to erase the written content.

Further, the object of the present invention is intended to solve the problems of the prior art, and is to provide a writing instrument with a writing function that simplifies the combination of the front tip erasing body and the lower body, does not weaken the overall strength of the above lower body, and removes a gap caused by the combination of the above front tip erasing body and the above lower body.

A writing instrument according to the present invention includes: a housing including an upper body and a lower body having a hollow tub shape; an ink filling tube containing ink inside the housing; a ballpoint pen tip making the adhesive ink flow on paper to write a word; and a knock cap ascending or descending the ink filling tube and the ballpoint pen tip in a vertical direction, wherein, the lower body consists of a single tube, forms a tip erasing body onto the external surface of the lower body; the tip erasing body is a part of the lower body, and is formed by double injection mold on the outer surface of the lower body, resulting in a single integrated shape with the lower body; the synthetic resin component of the tip erasing body forms a chemical bond with the synthetic resin component of the lower body, while the tip erasing body is bonded to the outer surface of the lower body; in addition, the tip erasing body is characterized in that it does not contain any form of gap when forming a binding relationship between the lower body.

In the present invention, preferably the synthetic resin component of the tip erasing body 120 is composed of 9 to 12 parts by weight of hydrogenated styrene isoprene butadiene block copolymer, 20 to 25 parts by weight of hydrotreated heavy paraffinic, 0.4 to 1.2 parts by weight of 1, 2, 3 benzotriazole, 0.2~0.8 parts by weight of zinc distearate, 2.4 to 5 parts by weight of polyethylene, 22 to 26 parts by weight of polypropylene, and 30 to 46 parts by weight of ethylene-propylene copolymer.

In the present invention, preferably the tip erasing body 120 is formed in a form of multiple protrusions which are formed uneven in an external direction on an outer peripheral surface of the lower body 112.

In the present invention, when the tip erasing body 120 is to be colored, it is preferable to add 0.002 to 0.02 parts by weight of a pigment based on the total weight.

Since the tip erasing body constitutes a part of a writing instrument body, it is not necessary to attach and use a separate elastomer eraser.

In addition, the present invention does not need to manually assemble the tip erasing body and the lower body or go through the assembly process in a mechanical manner, so the manufacturing process is simple and productivity is greatly improved.

In addition, since there is no gap between the lower body and the tip erasing body, the present invention has the advantage of preventing the failure of the tip erasing body in advance by opening the gap according to use.

DESCRIPTION OF THE PREFERRED EMBODIMENT

Hereinafter, the present invention will be described more specifically and in detail. Specific numerical values or specific examples provided herein are preferred embodiments of the present invention, and are only for explaining the technical idea of the present invention in more detail, and it is clear that the present invention is not limited thereto.

In the present invention, a front or a tip is a part where a ballpoint pen tip is located in a writing instrument, which means a direction of the ballpoint pen tip that comes out of the writing instrument or enters into the writing instrument, and a rear is the opposite direction of the front, which means a direction where the end of the writing instrument is present.

In addition, the writing instrument contains a fountain pen or signpen including the ballpoint pen, and the ballpoint pen can be exemplified as a writing instrument that can best implement the technical idea of the present invention.

In addition, in the specification of the present invention, detailed descriptions of parts that are known in the art and can be easily created by those of ordinary skill in the art will be omitted.

The present invention provides a writing instrument 100 which has a function to erasing words W wrongly written on the surface of a writing object P. The writing object P may representatively mean paper, and the word W written or disclosed on the paper of the writing object includes letters, numbers, symbols, and pictures.

The present invention relates to a writing instrument 100 having a function to erase a handwritten content, and includes a ballpoint pen, a foundation pen, a signpen, etc. In the present invention, for convenience of description, as a representative example of the writing instrument 100, the ballpoint pen will be described as an example.

Figure 1:
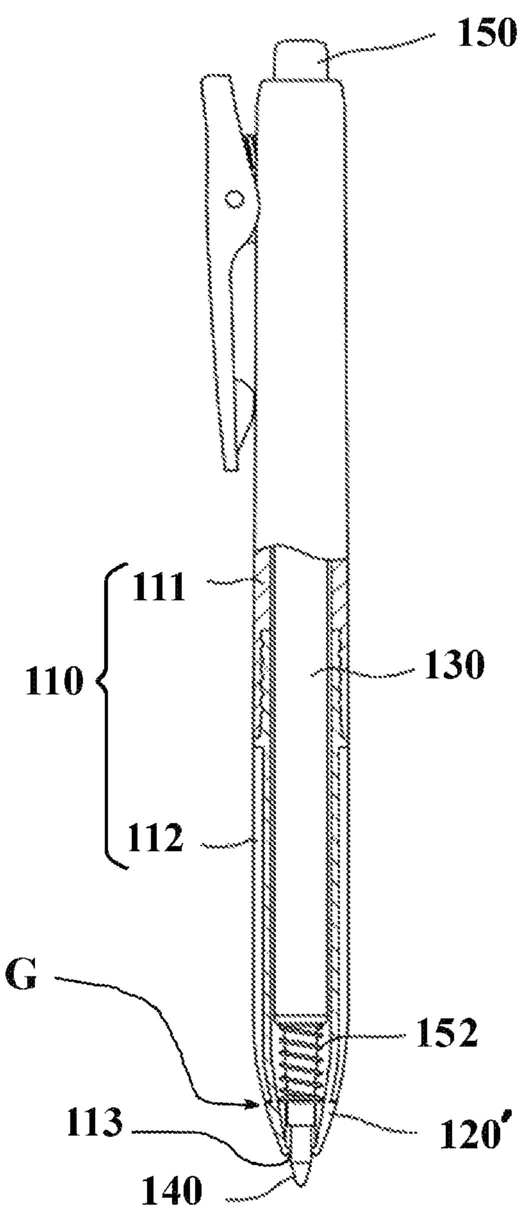
FIG. 1 Prior Art
FIG. 1 is a conceptual view of a prior writing instrument.

FIG. 1 is a model diagram of a writing instrument in the related art.

The ballpoint pen includes a housing 110 including an upper body 111 and a lower body 112 having a hollow tub shape. The housing 110 forms an exterior of the ballpoint pen, and may be formed by a single body or formed by the upper body 111 and the lower body 112 as illustrated in the accompanying drawings.

The ballpoint pen includes an ink filling tube 130 inside the housing 110. The ink filling tube 130 has ink filled therein, and the ink is used for writing or drawing a predetermined word W on the paper P.

The ballpoint pen includes a ballpoint pen tip 140 present at the tip of the ink filling tube 130. The ballpoint pen tip 140 includes a spherical ball therein, which allows the ink to flow onto the paper P to write the word W. The ballpoint pen may have a spring 152 having elastic force mounted between the outside of the ballpoint pen tip 140 and the inside of the lower body 112. The spring 152 acts on the ink filling tube 130, which provides elastic force so that the ink filling tube 130 is pushed up in an opposite direction to the ballpoint pen tip 140.

The ballpoint pen includes a knock cap 150 at a rear end of the ink filling tube 130. The knock cap 150 makes the ballpoint pen tip 140 coupled to the tip of the ink filling tube 130 downward of the ballpoint pen, and the word W be written or a picture be drawn on the paper P by using the ballpoint pen tip 140, when a user presses the knock cap 150. The ballpoint pen 140 comes out down through an exit hole 113 of the housing 110 or enters the inside of the housing 110 through the exit hole 113.

The present invention is an improved invention of prior art by the present inventors.

Figure 2A:
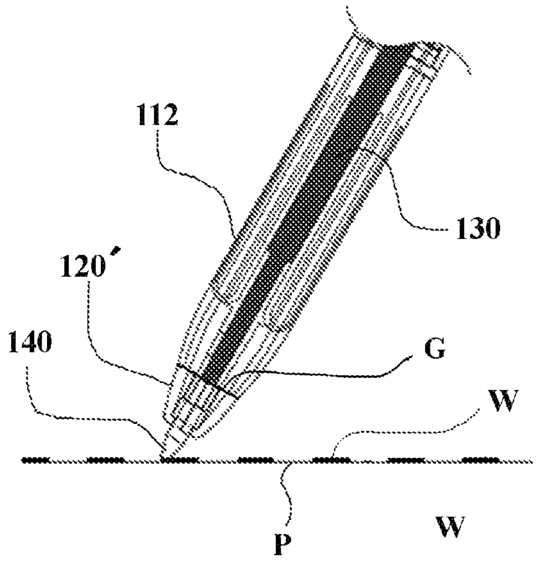
FIG. 2A Prior Art
FIGS. 2*a* to 2*c* are conceptual views for an erasing scheme of a handwritten content using frictional heat in the prior art.
Figure 2B:
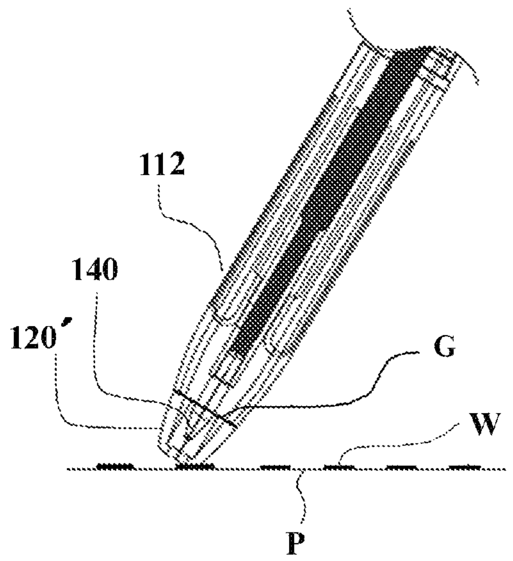
FIG. 2B Prior Art
Figure 2C:
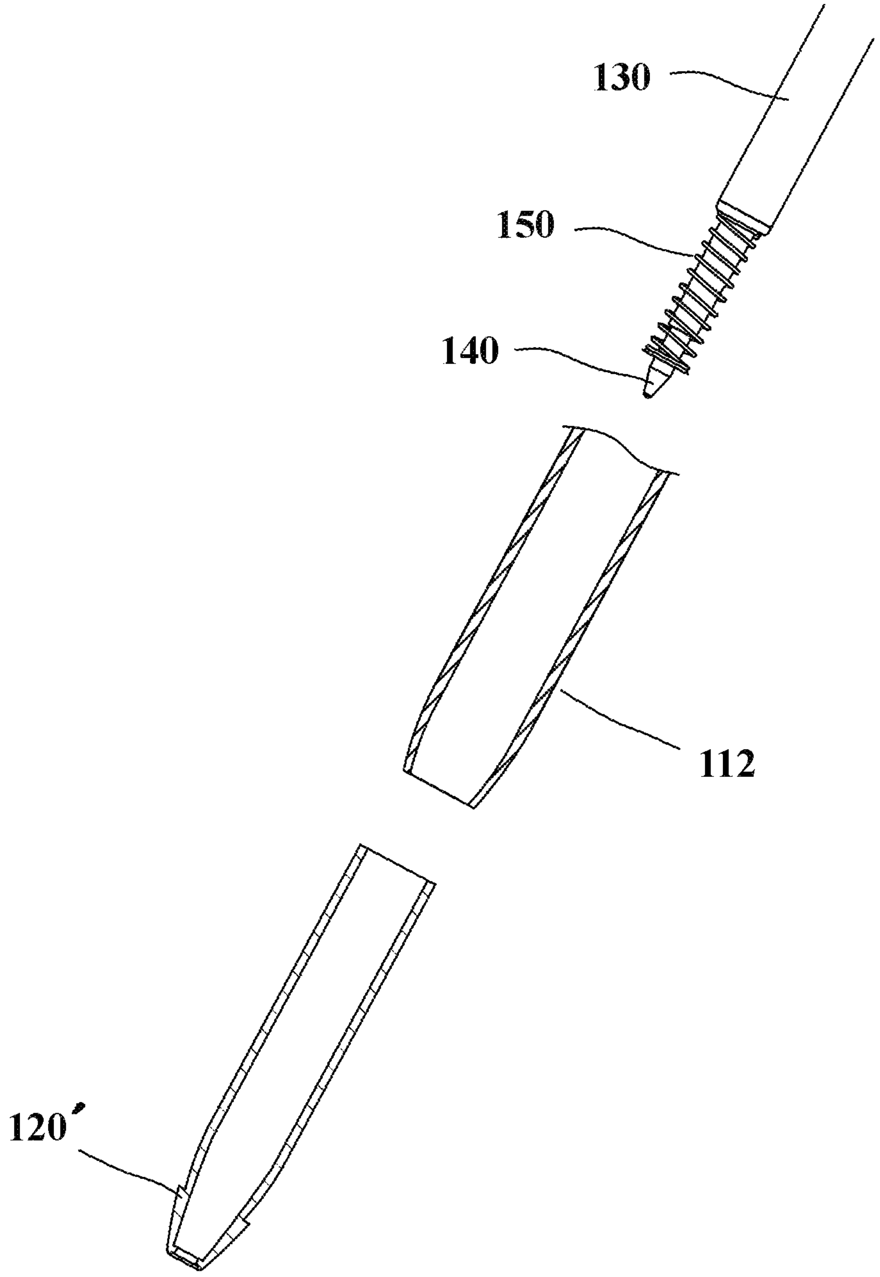
FIG. 2C Prior Art

The prior art refers to the above-mentioned Korean Patent Registration Nos. 10-2400822 and 10-2400821. The prior arts may erase a wrongly written word W by slightly pressing the tip erasing body 120' on the word W written on the paper P and rubbing the tip erasing body 120' horizontally as illustrated in FIGS. 2*a* and 2*b*. However, the tip erasing body 120' in the prior art is used while being coupled to the lower body 112 by a mechanical scheme. Therefore, the writing instrument in the prior art had three shortcomings as mentioned above.

The present invention provides a technical means for overcoming the disadvantages of the writing instrument in the prior art.

The present invention is used to make the lower body 112 in the form of a single tube and to form the same thickness as the thickness of a typical lower body. This is to compensate for and overcome the weakening of the overall external preservation power of the writing instrument as a result of forming the writing instrument by the prior art of these inventors in a thin lower body 112 and a thin tip erasing body 120'.

In this invention, a tip erasing body 120 is formed in front of the lower body 112, but the tip erasing body 120 is formed on the outer surface of the lower body 112. The tip erasing body 112 performs a function of erasing a word W incorrectly written on the paper P. The front tip erasing body 120 is formed on the outer surface of the lower body 112, but the front tip erasing body 120' according to the prior art is assembled at the front end of the lower body 112.

According to the present invention, the tip erasing body 120 is integrally formed on the outer surface of the lower body 112. The integrated type means that the tip erasing body 120 and the lower body 112 are manufactured in a form that can be distinguished externally, but the two components are made into a single component form and used. In order to manufacture the tip erasing body 120 and the lower body 112 in an integrated shape, it is preferable to use a double injection molding method.

As such, the writing instrument according to this invention is used by chemically making the tip erasing body 120 and the lower body 112 into a single part, whereas the writing instrument according to the prior art is used by physically assembling two parts to each other. In this respect, the form of the bond and the method of the bond are completely different.

In addition, since the writing instrument according to this invention uses the tip erasing body 120 and the lower body 112 as a single part, there is no form of gap G between them, but in the case of the prior art, there is inevitably a gap G between the tip erasing body 120' and the lower body 112.

In the present invention, it is preferable that the tip erasing body 120 is formed on the outer surface of the lower body 112 by a double injection molding method. The double injection molding method first fills the synthetic resin raw material of the lower body 112 inside one molding device, then fills the synthetic resin raw material of the tip erasing body 120, and then forms, cools, and takes out the double injection molded product. In this invention, since the tip erasing body 120 and the lower body 112 are double-injected and molded inside one molding device, there is no need to mechanically combine the tip erasing body 120 and the lower body 112.

According to the present invention, in the process of double injection of the tip erasing body 120 to the lower body 112, the tip erasing body 120 forms a solid chemical bond to the surface of the lower body 112.

In the present invention, the component of the tip erasing body 120 should have a binding force with polypropylene resin, the main raw material of the lower body 112, and at the same time, provide the friction force necessary to erase the word W described on the paper P. In this respect, the components of the tip erasing body 120 of this invention contain a polymer composition different from the components of the tip erasing body 120' of the prior art.

In the present invention, the polymer composition forming the tip eraser 120 may be composed of 9-12 parts by weight of a hydrogenated styrene isoprene butadiene block copolymer, 20-25 parts by weight of hydro-treated heavy paraffinic, 0.4-1.2 parts by weight of 1,2,3 benzotriazole, 0.2-0.8 parts by weight of zinc disterate, 2.4-5 parts by weights of polyethylene, 22-26 parts by weight of polypropylene and 30-46 parts by weight of ethylene-propylene copolymer.

Based on the total weight, the tip erasing body 120 may contain 9 to 12 parts by weight of a hydrogenated styrene isoprene butadiene block copolymer. The hydrogenated styrene isoprene butadiene block copolymer provides predetermined flexibility to the tip erasing body 120. When the hydrogenated styrene isoprene butadiene block copolymer is contained in an amount of 9 parts by weight or less, the flexibility is weak, whereas when it is contained in an amount of 12 parts by weight or more, the strength of the tip erasing body 120 is weakened, which is not preferable.

The tip erasing body 120 may include 20 to 25 parts by weight of the hydro-treated heavy paraffinic based on the total weight. The paraffinic performs a function of providing a predetermined contact surface roughness to the tip erasing body 120. It is difficult to remove smooth handwriting when the hydro-treated heavy paraffinic component is less than 20 parts by weight, whereas the surface roughness of the tip erasing body 120 becomes too strong when the hydro-treated heavy paraffinic component is more than 25 parts by weight.

The tip erasing body 120 may include 0.4 to 1.2 parts by weight of 1, 2, 3 benzotriazole based on the total weight. The 1, 2, 3 benzotriazole functions as an antioxidant. When the antioxidant is used in an amount of 0.4 parts by weight or less, the oxidation prevention function may not be properly performed, whereas when the antioxidant is used in an amount of 1.2 parts by weight or more, the oxidation prevention function does not increase in proportion to the amount, and thus it is not preferable to include more than that.

The tip erasing body 120 may include 0.2 to 0.8 parts by weight of zinc distearate based on the total weight. The zinc distearate plays a role in improving the flowability of the molten double injection molding process. This is because the molten double injection must flow along the upper surface of the lower body 112 to form the shape of the tip eraser 120, so if the flowability is not good, a normal tip eraser 120 cannot be created. When the zinc distearate is less than or equal to 0.2 parts by weight, the flowability of the melt is not good, whereas when the zinc distearate is injected in an amount of 0.8 parts by weight or more, the flowability of the melt is too good and may be counterproductive.

The tip erasing body 120 may include 2.4 to 5 parts by weight of polyethylene based on the total weight. The polyethylene has a double bond structure between a carbon atom and a carbon atom, and thus has flexibility in a polymer resin. The polyethylene functions as a binder bonded to the ethylene-polypropylene copolymer introduced below. When the polyethylene is included in an amount of 2.4 parts by weight or less, the bonding force between the polyethylene and the ethylene-polypropylene copolymer is weak, but when the polyethylene is added in an amount of 5 parts by weight or more, the bonding force does not increase in proportion to the input amount.

The tip erasing body 120 may include 22 to 26 parts by weight of polypropylene based on the total weight. The above polypropylene is required to maintain the strength of the above tip erasing body 120 and at the same time provide a binding force with the polypropylene resin, the main raw material of the above lower body 112. It is generally present in the range of 22 to 26 parts by weight, but may vary slightly in the range of the lower limit and the range of the upper limit depending on the content of each component listed above.

The tip erasing body 120 may include 30 to 46 parts by weight of the ethylene-propylene copolymer based on the total weight. The ethylene-propylene copolymer includes both a propylene component and an ethylene component in its molecular structure, and thus may exhibit a binding force to the polypropylene polymer component on the one hand and a binding force to the polyethylene polymer component on the other hand. This is because the tip erasing body 120 according to the present invention is formed by a double injection mold on the outer surface of the lower body 112, so the coupling force with the lower body 112 is paramount. When the ethylene-propylene copolymer is contained in an amount of 30 parts by weight or less, the binding force is weak, whereas when the ethylene-propylene copolymer is contained in an amount of 46 parts by weight or more, the binding force is sufficient, but the strength of the tip erasing body 120 is weakened.

In this invention, in order to make it easier for users to distinguish the tip eraser 120, 0.002 to 0.02 parts by weight of pigment can be preferably added based on the total weight. The pigment gives a color to a plastic molding and may be commonly used in this technical field.

In this invention, it is desirable that the tip erasing body 120 includes a number of protrusions formed to be protruded outward from the outer peripheral surface of the lower body 112.

Figure 3A:
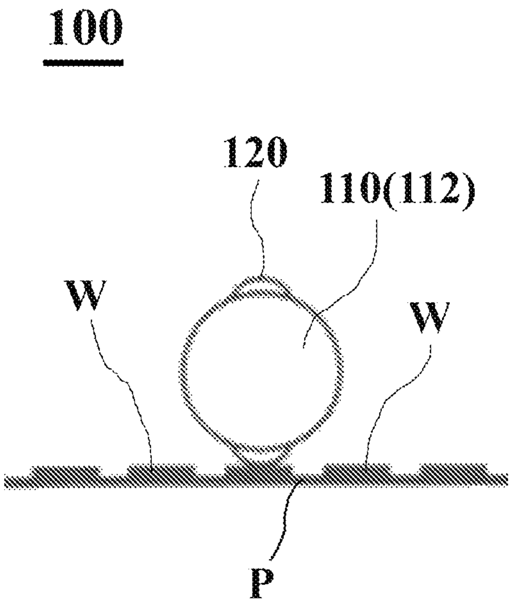
FIGS. 3*a* to 3*e* are cross-section views schematically illustrating preferred embodiments of the tip erasing body according to the present invention.
Figure 3B:
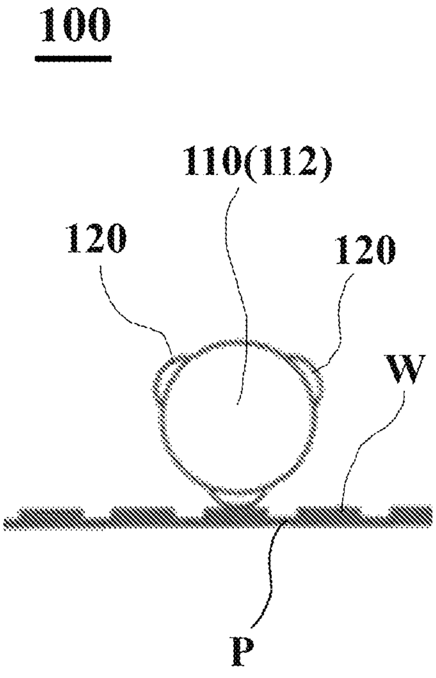
Figure 3C:
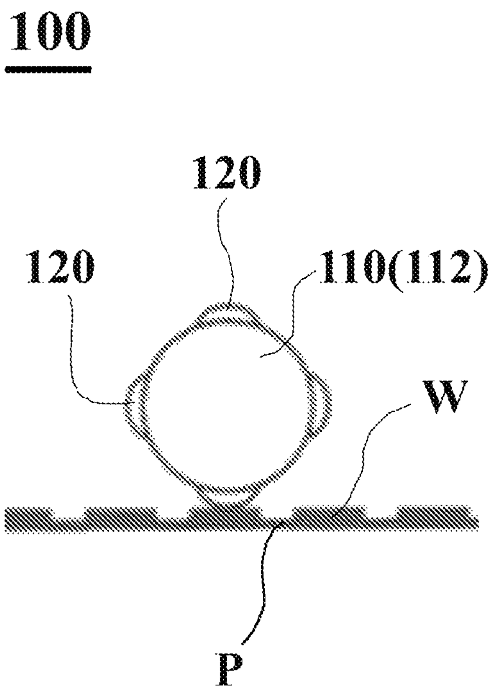
Figure 3D:
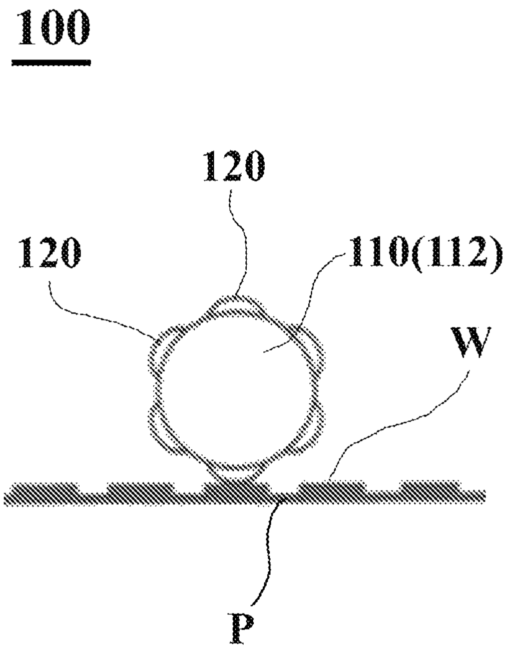
Figure 3E:
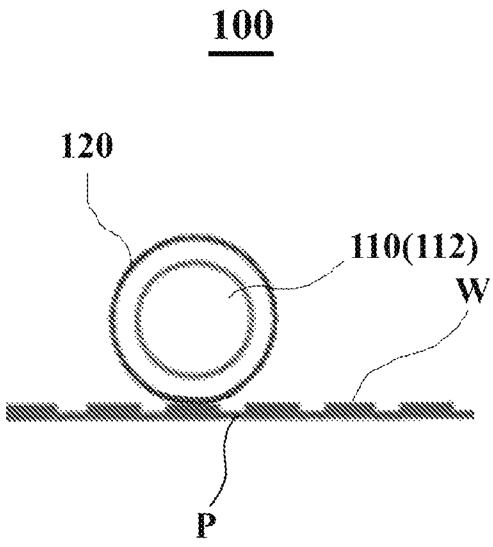

FIGS. 3*a* to 3*e*, which are attached, show the form of forming a plurality of bulges in sectional view. FIG. 3*a* shows that the tip eraser 120 is formed of two protrusions, FIG. 3*b* shows that the front end eraser 120 is formed of three protrusions, FIG. 3*c* shows that the tip eraser 120 is formed of four protrusions, FIG. 3*d* shows the tip erasing body 120 formed of six protrusions, and FIG. 3*e* shows the tip erasing body 120 completely surrounding the outside of the lower body 112.

This invention is about a writing instrument that can immediately erase contents such as words misstated on paper P using the tip eraser 120, and the adhesive ink introduced in the prior art can be used.

The present invention having such a configuration may be efficiently used to immediately erase incorrectly described content.

Figure 4:
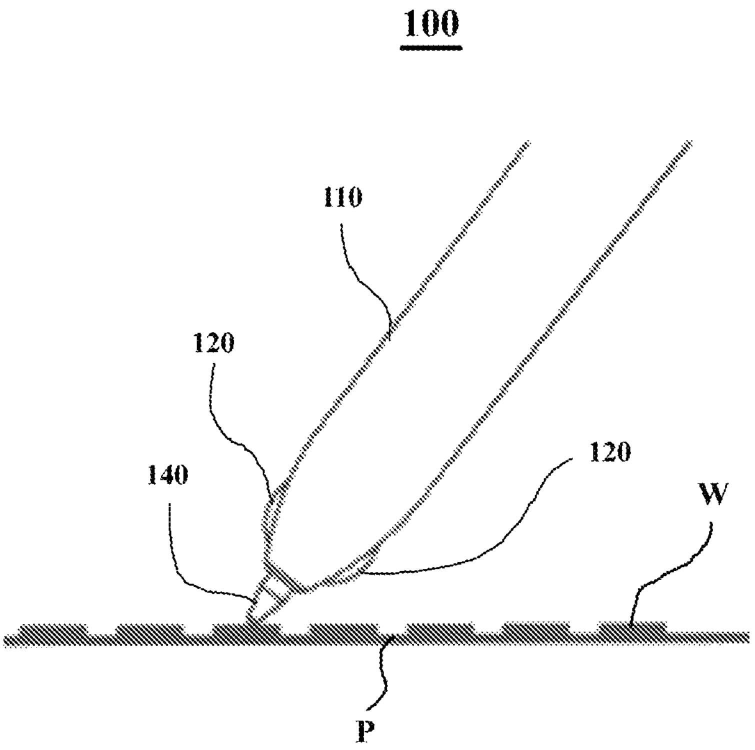
FIG. 4 is a conceptual view showing a state in which words are written on the surface of a writing object using the writing instrument according to the present invention.
Figure 5:
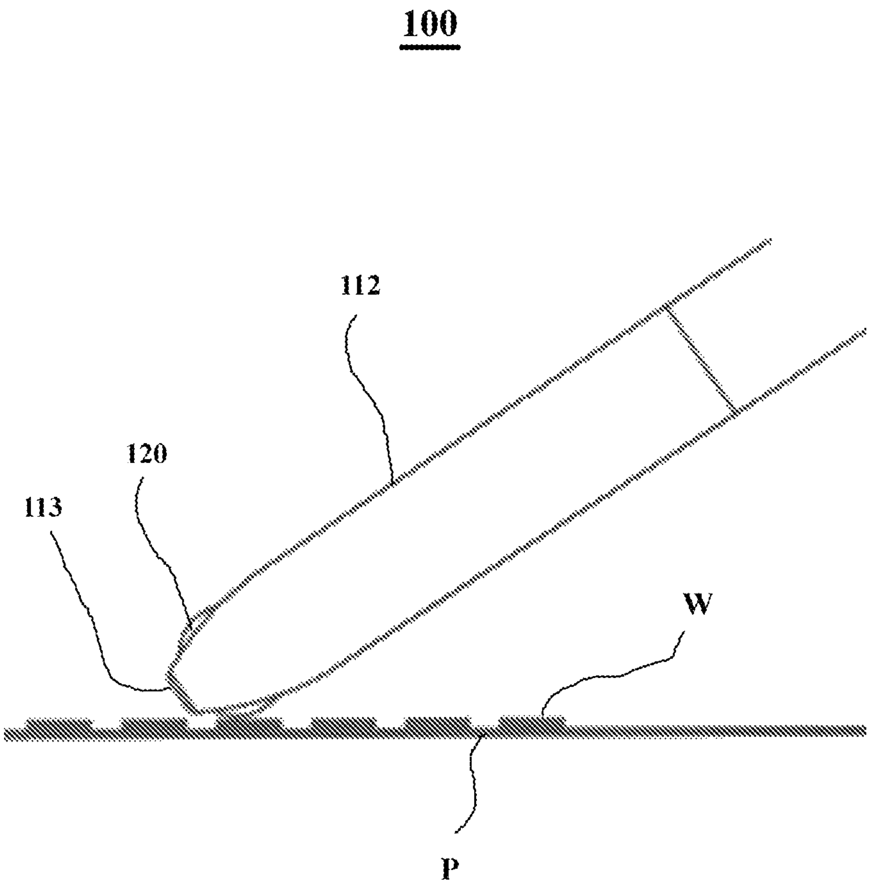
FIG. 5 is a conceptual view illustrating a state of erasing words, which are handwritten contents recorded on the surface of a handwriting object, using a writing instrument according to the present invention.

FIG. 4 is a conceptual view showing a state in which words W are written on the surface of a writing object P using the writing instrument 100 of the present invention, and FIG. 5 is a conceptual view illustrating a state of erasing words W, which are handwritten contents recorded on the surface of a handwriting object P, using the writing instrument 100 of the present invention.

A person who wants to use the writing instrument 100 according to this invention can use a writing instrument to write something W on the paper P.

If the user wants to erase the wrong word W, he/she contacts the above-mentioned tip eraser 120 while holding the writing instrument, presses the above-mentioned tip eraser 120 slightly, and moves it in a reciprocating manner in the left and right direction. Then, the misstated word W falls off the paper P and is easily erased.

Although the writing instrument having the erasing function of handwriting content according to this invention has been specifically presented above, this is only specified in the process of explaining the embodiment of this invention, and all features of this invention should not be construed as applying only to the above-mentioned items.

In addition, any person with ordinary knowledge in this field of technology can perform various modifications and imitations according to the description of the present invention, but it is clear that this is also not outside the scope of the present invention.

What is claimed is:

1. A writing instrument having a removal function of a handwritten content, comprising: a housing having a hollow tub shape; an ink filling tube containing an adhesive ink inside the housing; a ballpoint pen tip making the adhesive ink flow on paper P to write words W; and a knock cap ascending or descending the ink filling tube and the ballpoint pen tip in a vertical direction, wherein, a lower body of the housing consists of a single tube, and forms a tip erasing body onto an outer surface of the lower body;

the tip erasing body is a part of the lower body, and is formed by double injection mold on the outer surface of the lower body, resulting in a single integrated body with the lower body;

a first synthetic resin component of the tip erasing body forms a chemical bond with a second synthetic resin component of the lower body, while the tip erasing body is bonded to the outer surface of the lower body, wherein the first synthetic resin component of the tip erasing body is made of a hard compound resin; and wherein the tip erasing body does not contain any form of gap when forming a binding relationship with the lower body.

2. A writing instrument having a removal function of a handwritten content of claim 1, wherein the tip erasing body is formed in a double injection mold on the outer surface of the lower body.

3. A writing instrument having a removal function of a handwritten content of claim 1, wherein the tip erasing body includes multiple protrusions which are formed in an outward direction on an outer peripheral surface of the lower body.

4. A writing instrument having a removal function of a handwritten content of claim 1, wherein the first synthetic resin component of the tip erasing body is composed of 9 to 12 parts by weight of hydrogenated styrene isoprene butadiene block copolymer, 20 to 25 parts by weight of hydrotreated heavy paraffinic, 0.4 to 1.2 parts by weight of 1,2,3 benzotriazole, 0.2 to 0.8 parts by weight of zinc distearate, 2.4 to 5 parts by weight of polyethylene, 22 to 26 parts by weight of polypropylene, and 30 to 46 parts by weight of ethylene-propylene copolymer.

5. The writing instrument having a removal function of a handwritten content of claim 4, wherein the tip erasing body includes 0.002 to 0.02 parts by weight of a pigment based on the total weight.

6. The writing instrument having a removal function of a handwritten content of claim 1, wherein the first synthetic resin component of the tip erasing body comprises polypropylene.

* * * * *